United States Patent Office 3,264,451
Patented August 2, 1966

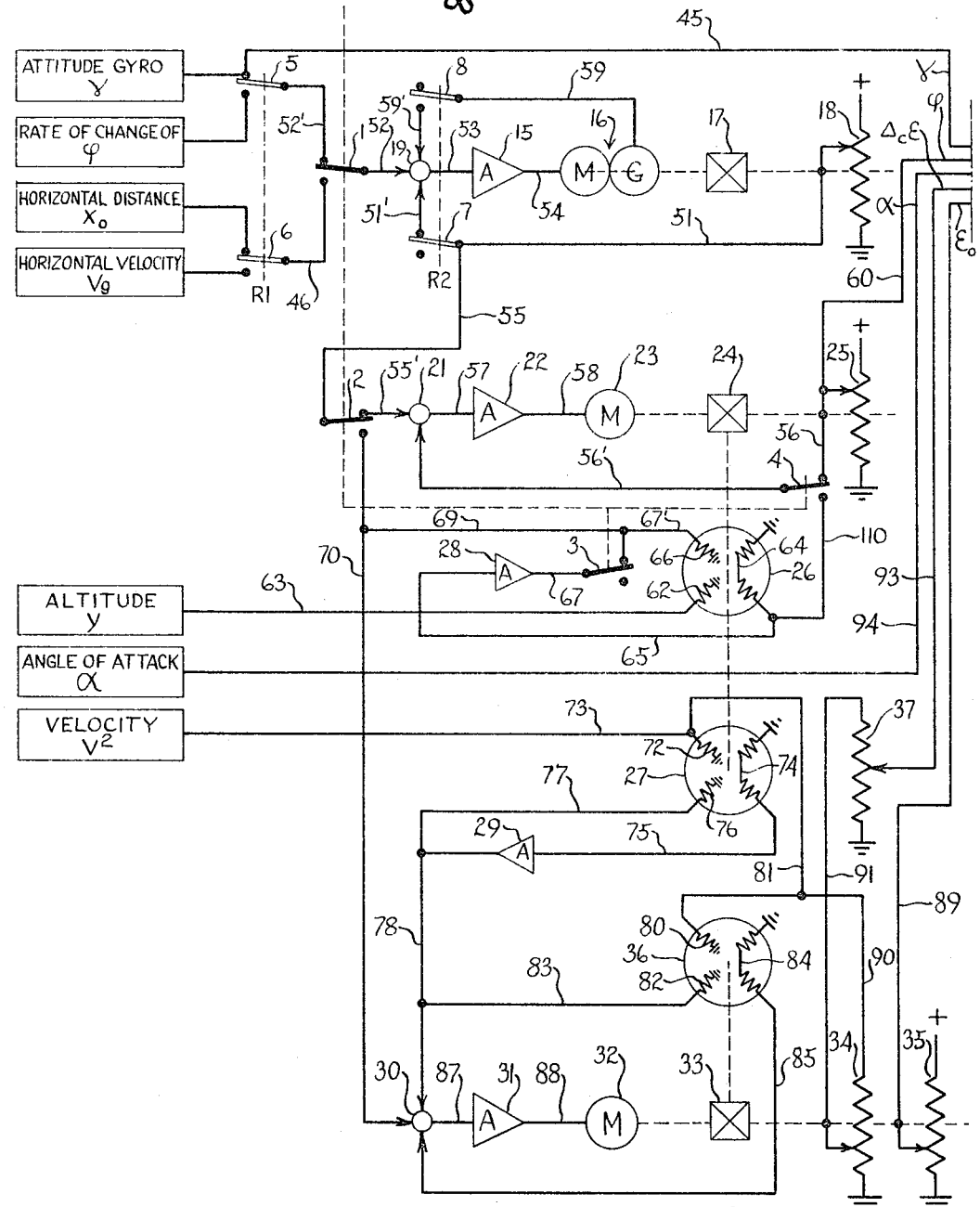

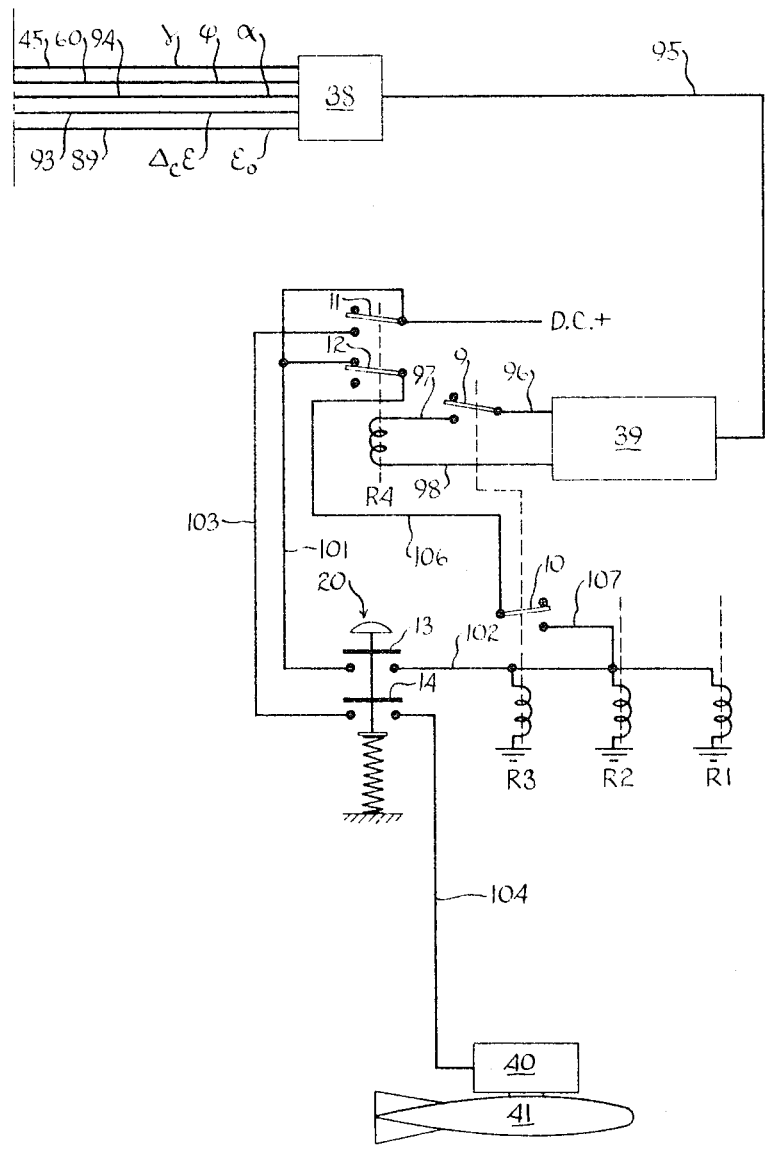

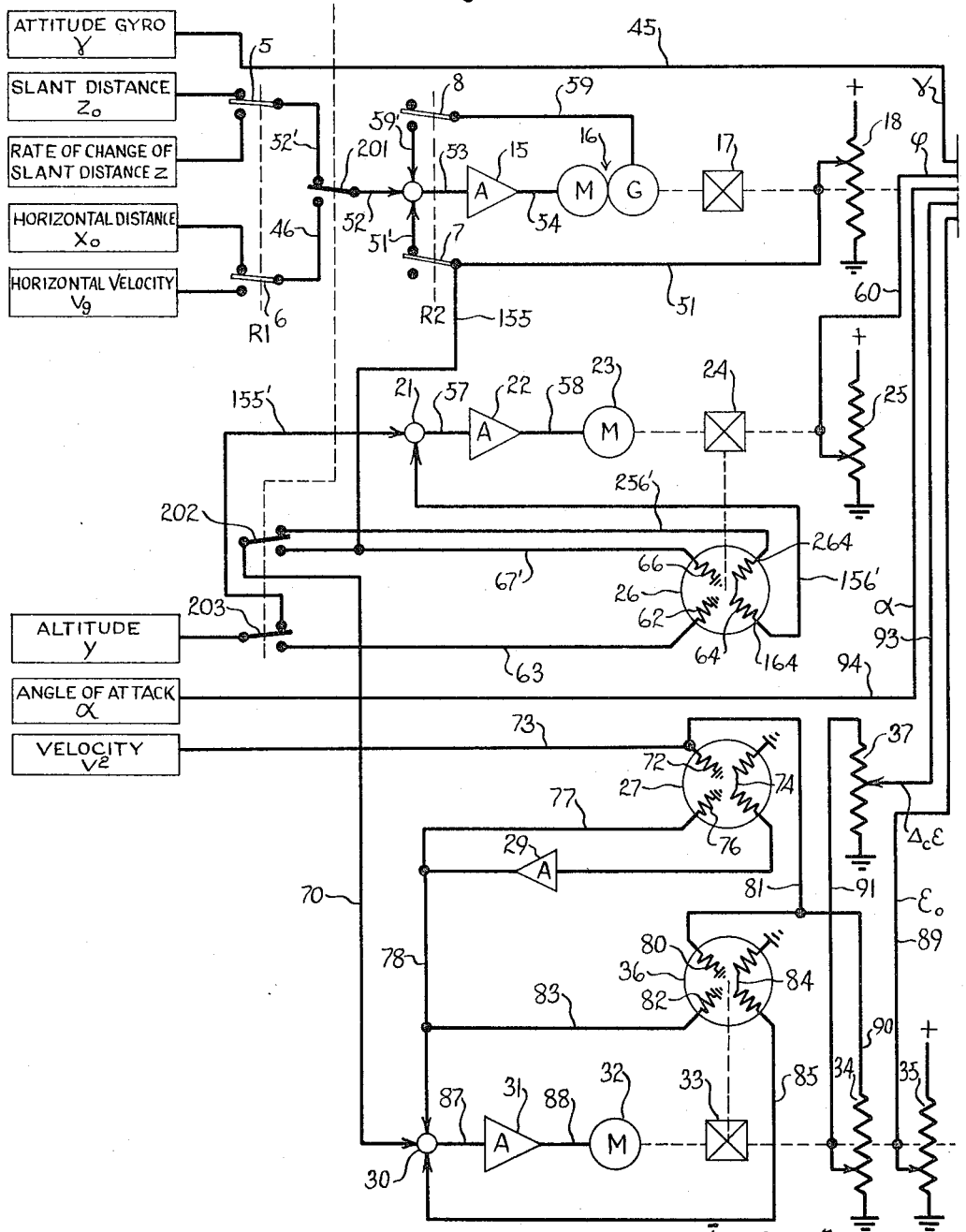

3,264,451
TOSS BOMBING INSTRUMENTALITY
Per Torsten Faxen and Knut Arne Rosell, Jonkoping, Sweden, assignors to Svenska Aeroplan Aktiebolaget, a corporation of Sweden
Filed Oct. 1, 1962, Ser. No. 227,145
3 Claims. (Cl. 235—61.5)

This invention relates to bombing instruments for aircraft and refers more particularly to an automatic computer which is capable of use for different modes of bombing, the particular mode to be used in any attack being selectable by the pilot, and in each of which modes the instrument effects automatic release of a bomb when the several factors involved in the bombing situation bear such a relationship to one another that a bomb then released will strike the target.

Different modes of aiming and automatically releasing a bomb carried by an aircraft are known, most of them being dependent upon computing instrumentalities carried in the aircraft and which respond to certain data that are predetermined and preset in the instrumentality and other data that are collected by instrumentation in the aircraft. The purpose of any such bombing instrumentality is of course to effect automatic release of a bomb from the aircraft at that one instant in the bombing run at which the trajectory imparted to the bomb will carry it to the target.

One well known bombing mode, generally designated toss bombing from a dive, and a computer instrumentality for carrying it out, are described in Patent No. 2,609,729, to E. A. Wilkenson et al. In toss bombing from a dive (illustrated in FIGURE 1 of the accompanying drawings) the pilot enters a more or less shallow dive toward the target to align the aircraft longitudinally with the target, using for this purpose an optical sight having its axis generally parallel to the longitudinal axis of the aircraft. When satisfied that such alignment has been attained, the pilot presses a so called "pickle switch" on his control stick and then makes a wings-level pull-out from the dive at any desired rate. During the pull-out the computer makes a continuous calculation that eventuates in automatic release of the bomb at the proper instant to carry it accurately to the target.

From a tactical standpoint it is desirable that any bombing instrumentality be adaptable to more than one mode of bombing, so that a pilot using the device is not constrained to a single pattern of operation which defending forces can quickly learn and anticipate, or which might be frustrated by weather or other conditions at the target area.

With this in mind it is an object of the present invention to provide a bombing instrumentality or computer which is adapted for use both in toss bombing from a dive and in another mode of toss bombing which can be designated pull-up release from level flight, and which instrumentality provides for selection of either bombing mode at the option of the pilot.

In pull-up release from level flight (illustrated in FIGURE 2) the pilot approaches the target in level flight, preferably at a very low altitude, and from a direction that will place him on a course to the target when he is over a predetermined identification point (IP) on the ground that is a known distance from the target. In preparation for the attack the distance between the target and the IP is manually preset in the bombing instrumentality. When exactly over the IP the pilot presses the pickle switch and then begins a wings-level pull-up at any desired rate. The bomb is automatically released at the proper point in the pull-up to give it a trajectory which will accurately carry it to the target. It will be apparent that pull-up release bombing has many features in common with toss bombing from a dive. The two types of toss bombing will hereinafter be respectively designated, for simplicity, as pull-up bombing and dive toss bombing.

Another and more specific object of this invention is to provide a relatively simple, compact and light weight bombing instrumentality of the character described embodying certain analogue computer devices that can be employed interchangeably in both dive toss bombing and pull-up bombing, and which devices can be electronic, mechanical, or, as in the preferred embodiment, electro-mechanical devices.

Another specific object of the invention is to provide a bombing computer instrumentality of the character described which is adaptable for use with different types of instrumentation for obtaining information concerning the variables that enter into the toss bombing computation, so that the instrumentality of this invention is adaptable to whatever type of instrumentation may be present in an airplane in which it is to be installed.

Another object of this invention relates to the nature of the data available from known and generally used aircraft instrumentation. At the instant the pickle switch is depressed the position of the aircraft with respect to the target is ascertainable in terms of distance coordinates or a distance and an angle. Thereafter, however, the primary data available at the aircraft and useful in defining its position with respect to the target are mainly in the nature of outputs from rate sensing instrumentalities such as accelerometers and airspeed and vertical velocity sensing devices. Such primary data outputs can be readily utilized by computing means of known types to produce an output corresponding to the rate of change of the angle between the horizontal and a straight line connecting the target and the aircraft, but the solution of the toss bombing problem requires the provision of an output which at every instant after depression of the pickle switch corresponds to a function of the value of that angle at that instant.

It is therefore another specific object of this invention to provide a toss bombing computer of the character described which incorporates simple integrating means adapted to utilize rate information that is readily available in the aircraft, and by which an output is produced that corresponds, at each instant after depression of the pickle switch, to the value at that instant of the angle between the horizontal and a straight line connecting the aircraft and the target.

It is also a specific object of this invention to provide a basic bombing instrumentality of the character described which can be readily and conveniently modified, as by means of accessory attachments, to adapt it for other variants of the toss bombing modes for which it is intended and which, more specifically, enable it to be used with rockets as well as bombs, and enable it to provide correction for wind conditions at the target and/or for motion of the target.

It is a further specific object of this invention to provide means in a toss bombing computer of the character described for replacing the mechanical three-dimensional ballistic cam which has heretofore been conventional in such computers, and which means comprises an electromechanical resolver, such as an induction resolver or a sine-cosine potentiometer, actuated by a servo which is connected with other instrumentalities in the computer and in feedback relation with the resolver.

With the above and other objects in view which will appear as the description proceeds, this invention resides in the novel construction, combination and arrangement of parts substantially as hereinafter described and more particularly defined by the appended claims, it being understood that such changes in the precise embodiments of the hereindisclosed invention may be made as come within the scope of the claims.

The accompanying drawings illustrate several complete examples of physical embodiments of the invention constructed according to the best modes so far devised for the practical application of the principles thereof, and in which.

FIGURES 4a and 4b constitute a schematic diagram of one embodiment of this invention wherein the quantities altitude, velocity and dive angle are measured and calculated when the instrumentality is used in dive toss bombing, and the quantities altitude, horizontal distance and velocity are measured and computed in pull-up release bombing; and FIGURE 5, taken with FIGURE 4b, constitutes a schematic diagram of a modified embodiment of the invention in which the instrumentality utilizes, in dive toss bombing, slant range data obtained, e.g., from radar equipment.

Figure 1:
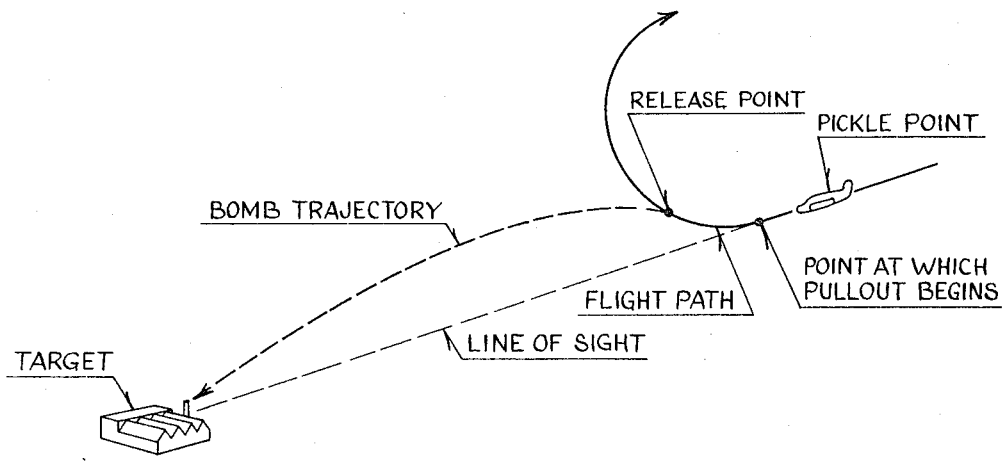
FIGURE 1 is a diagram illustrating the tactic of dive toss bombing, which is one of the toss bombing modes for which the instrumentality of this invention is adapted.
Figure 2:
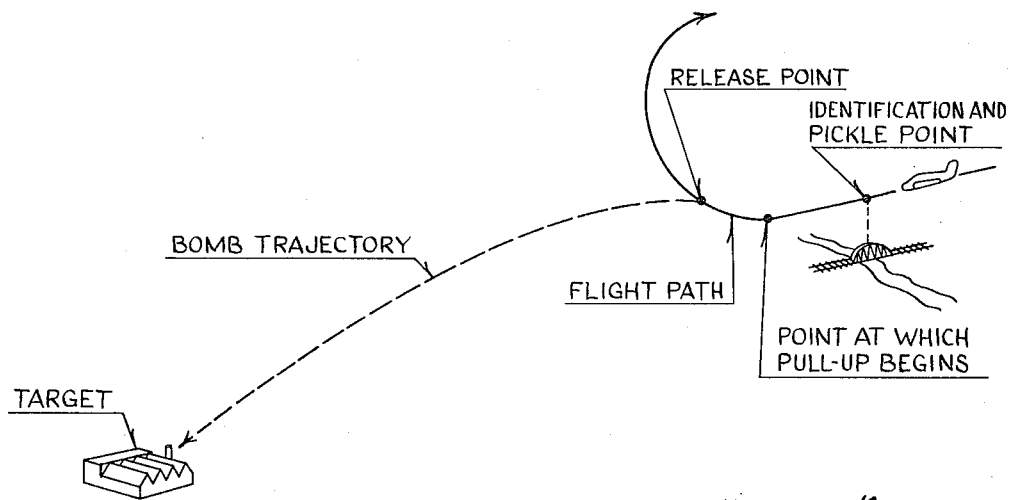
FIGURE 2 is a diagram illustrating pull-up release bombing, another of the toss bombing modes for which the instrumentality of this invention is fitted.

Referring now to the accompanying drawings, and referring first to FIGURES 1 and 2, it will be observed that in each of the two modes of toss bombing hereinabove described the pilot depresses the pickle switch at a point in the bombing run (pickle point) at which the aircraft is in an ascertainable relationship to the target, and that depression of the pickle switch (pickling) initiates the automatic computation which brings about release of the bomb when all conditions are satisfied for causing the bomb to follow a trajectory which terminates at the target. In dive toss bombing (FIGURE 1) the position of the aircraft relative to the target is ascertainable at the pickle point because that position can be given as a function of the angle which the optical axis of the sight makes to the horizontal and of either the altitude of the airplane relative to the target (ascertainable by air data computer means) or the distance from the aircraft to the target along the line of sight (ascertainable by slant range radar). In pull-up release bombing (FIGURE 2), pickling of course occurs at a known distance from the target and at an altitude relative to the target which is ascertainable, and the angle between the horizontal and a straight line connecting the target with the aircraft at the pickle point is likewise ascertainable as a trigonometric function of these coordinate distances.

Figure 3:
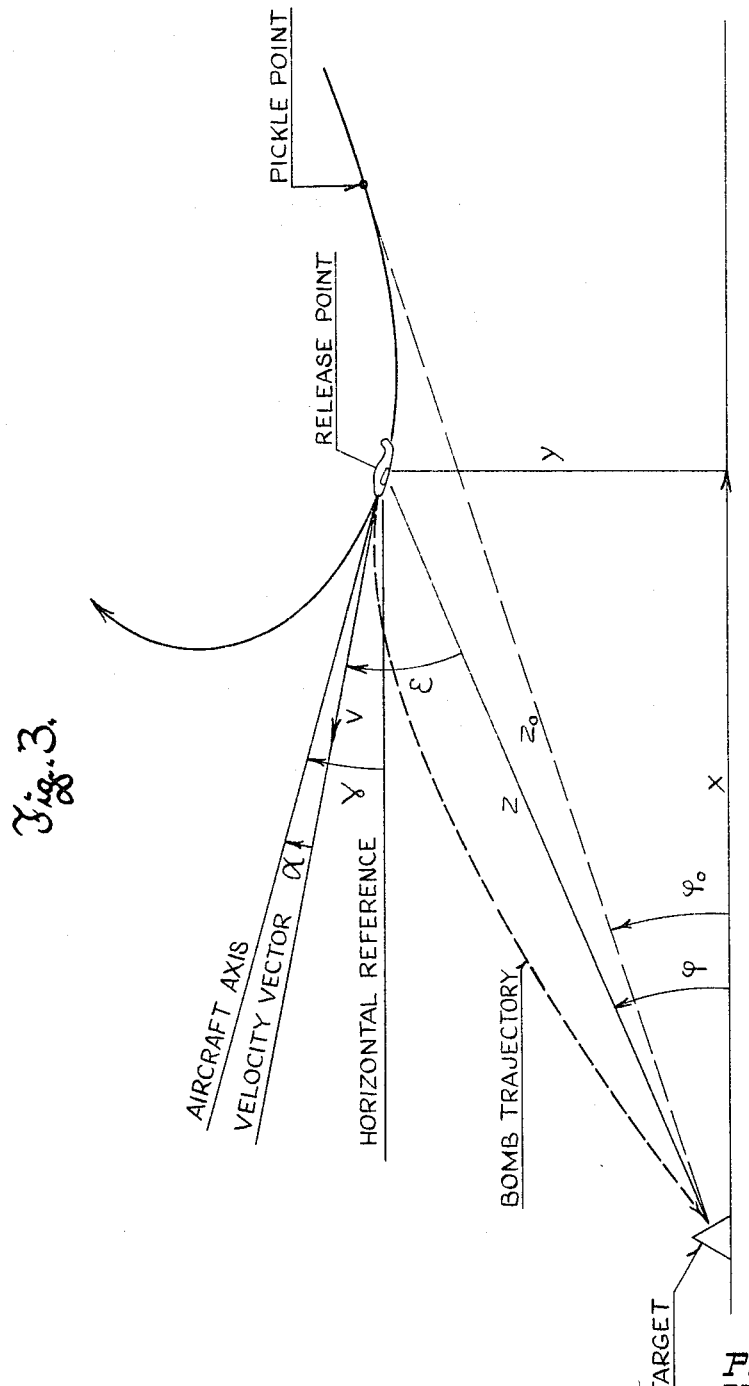
FIGURE 3 is a diagram illustrating the quantities that are measured and computed in the instrumentality of this invention during the course of a toss bombing run.

FIGURE 3 illustrates the principal quantities involved in the computation made by the bombing instrumentality of this invention. These are as follows, and it should be noted that all of the defined angles lie in a vertical plane because the aircraft is assumed to maintain a wings-level attitude throughout the bombing run; that is, its flight path from pickle to the instant of bomb release is assumed to lie in a single vertical plane through the target.

$\gamma$, the angle between the horizontal and the optical axis of the sight in the aircraft.

$\gamma_1$, the value of $\gamma$ at the instant of bomb release.

$a$, aerodynamic angle of attack of the aircraft, referenced to the optical axis of the sight.

$\epsilon$, that angle between the velocity vector of the aircraft and a line connecting the aircraft and the target which is required at the instant of bomb release for the bomb to hit the target.

$\varphi$, the angle between the horizontal and a line connecting the aircraft and the target.

$v$, the velocity of the aircraft.

$x$, the horizontal distance between the aircraft and the target.

$y$, the vertical distance between the aircraft and the target.

$z$, the slant (straight line) distance between the aircraft and the target.

When a bomb is released from an aircraft it has, at the instant of its release, a velocity and direction which are the same as those of the aircraft, but during its free fall, due to the action of gravity and aerodynamic forces on the bomb, it follows a more or less curved path in a vertical plane. In order that the bomb hit its target, its initial direction must diverge from a line connecting the aircraft with the target by such an angle that full compensation for the curvature of the path of the bomb is achieved. This angle of divergence is designated above by $\epsilon$, and in considering the above definition of the angle of divergence it should be borne in mind that at the instant of release the bomb and the aircraft have identical velocity vectors.

From FIGURE 3 it will be apparent that at the moment of release $\gamma_1 = \epsilon - \varphi + a$.

In the several embodiments of the present invention the calculation of the angle of divergence required for correct bomb release takes place according to the relationship $\epsilon = \epsilon_0 + \Delta_c\epsilon$, where $\epsilon_0$ is the ideal angle of divergence, that is, the angle of divergence that would obtain if the bomb were released in a vacuum, and $\Delta_c\epsilon$ is the angular correction of $\epsilon_0$ required to compensate for the effects of air drag.

The ideal angle of divergence $\epsilon_0$ is computed in the instrumentality of this invention from the exact relationship $$x = v^2/g\ (\tan \varphi + \sin 2\epsilon_0 - \tan \varphi \cos 2\epsilon_0)$$

from which it is found that $\epsilon_0$ can be formally written $\epsilon_0 = f_0(v, \varphi, x)$. Similarly it can be shown that a good approximation of the angular correction is given by $\Delta_c\epsilon = C \cdot f_1(v^2, \varphi, \epsilon_0)$ where $C$ is the bomb ballistic factor ($C=0$ for an ideal bomb having no air drag) and $f_1$ is a specific function of the variables $v$, $\varphi$ and $\epsilon_0$. In practical applications it has been found that the function $f_1$ is almost proportional to $v^2$ and is also only slightly dependent on $\varphi$ so that a satisfactory approximation is given by $\Delta_c\epsilon = Cv^2 f_2(\epsilon_0)$, where $f_2$ is a function of $\epsilon_0$ only.

The embodiment of the invention diagrammatically illustrated in FIGURES 4a and 4b is a toss bombing computer which is intended to be installed in an aircraft having optical sight means (not shown), the axis of which is substantially parallel to the longitudinal axis of the aircraft, a pickle switch 20, suitable electric power supplies, and certain other equipment, the nature of which will be obvious to those skilled in the art. It will be understood that the aircraft is also equipped with the following sensing devices, which are not shown in the drawings but which are known in themselves, each of which is capable of producing an output that can be fed into the computer:

Attitude reference, in the nature of a free gyro or gyro platform for producing an output corresponding to the value of the above mentioned angle $\gamma$.

Altimeter means for producing an output corresponding to the altitude of the aircraft above the target.

Speed sensing means, for producing an output corresponding to the square of the speed of the aircraft.

Angle of attack sensing means, for producing an output corresponding to the aerodynamic angle of attack of the aircraft referenced to the optical axis of the sight.

Associated with the computer, but not necessarily comprising a part of the computer proper as hereinafter described, there must also be means for producing an output corresponding to the rate of change of $\varphi$, or in other words the angular velocity of the line connecting the aircraft and the target. The production of this output can be accomplished by known computing means that utilize data supplied either by the above mentioned sensing devices or by other sensing devices that may be present in the aircraft, operating alone or in conjunction with the above mentioned sensing devices or some of them. Since they are known to those skilled in the art, details of the computer for ascertaining rate of change of $\varphi$ are not disclosed herein, and FIGURE 4a merely indicates that an output corresponding to the value of that rate of change is made available to the instrumentality of this invention. Also associated with the computing instrumentality is a control device, preferably comprising a panel (not shown) accessible to the pilot and having means thereon for switching the instrumentality on and off and for manually presetting the bombing mode elected by the pilot and certain data that can be known in advance of the bombing mission. When the pilot sets into the control device a selection of a desired bombing mode he thereby effects simultaneous positioning (either by means of relays or direct mechanical connections) of four single-pole double-throw switches in the computing instrumentality, designated by reference numerals 1, 2, 3, and 4. In FIGURE 4a these switches are shown in their positions for dive toss bombing; in their positions opposite to those shown they set up the instrumentality for pull-up release bombing.

The instrumentality also includes two single-pole double-throw switches 5 and 6 which comprise elements of a relay R1 controlled by the pickle switch 20, and two single-pole single-throw switches 7 and 8 which comprise elements of another relay R2 controlled by the pickle switch. Switch elements 5–8 are illustrated in the positions that they maintain prior to pickle, that is, when the pickle switch 20 is open and the relays R1 and R2 are unenergized.

In general the computer comprises the following principal elements:

An integrating servo, comprising a servo amplifier 15, a motor-generator 16, a potentiometer 18, a gear train 17 or similar mechanical connection between the motor-generator and the potentiometer, and a comparator 19.

A $\varphi$-servo, comprising an amplifier 22, a motor 23, a potentiometer 25, a gear train 24 or other mechanical connection between the motor 23 and the potentiometer 25, a comparator 21, and resolvers 26 and 27 which are mechanically connected with the motor 23 by means of the gear connection 24.

An $\epsilon$-servo, comprising an amplifier 31, a motor 32, a resolver 36 connected with the motor 32 by means of a gear train 33 or similar mechanical connection, a pair of potentiometers 34 and 35 which are mechanically connected with motor 32 by means of gear connection 33, and a potentiometer 37 which is manually adjustable at the control device in accordance with a known value of C, the ballistic factor for the bomb or bombs being carried on the mission.

A summation device 38 (see FIGURE 4b).

Bomb release impulse means 39 connected with the summation device to be responsive to its output and which is in turn connected with a relay R4 that controls the circuit of a bomb release device 40 by which a bomb 41 is held until the moment of release.

*FIGURES 4a–4b Apparatus—Dive toss bombing mode*

Assume now that the device has been switched on and is in the condition illustrated in FIGURES 4a and 4b, set up for dive toss bombing and with the pickel switch 20 not yet depressed. Under these conditions a voltage output from the attitude gyro, corresponding to the angle $\gamma$ of the optical axis will be fed through the relay actuated switch element 5 and the manually positionable switch 1 to the integrating servo. The arrangement of the integrating servo is such that the position of the movable wiper of potentiometer 18 corresponds, under the assumed conditions, to the value of the angle $\gamma$.

Specifically, the wiper of potentiometer 18 is electrically connected with the comparator 19 by means of a conductor 51, the switch element 7, and another conductor 51', so that a feedback from said potentiometer comprises one input to the comparator. By means of a conductor 52 connected between the comparator 19 and switch 1, and another conductor 52' connected between a terminal of switch 1 and switch element 5, the output of the attitude gyro is fed to the comparator as another input. So long as the position of the wiper of potentiometer 18 corresponds to the angle $\gamma$ as manifested in the attitude gyro output, there will be a zero output from the comparator; but if, for example, the aircraft noses up or down, the changed output of the attitude gyro will cause the comparator to produce a corresponding output that will be fed to the amplifier 15 by way of a conductor 53 that connects the output terminal of the comparator with the amplifier input. The amplified signal from the comparator is fed to the motor element of the motor generator 16 by way of a conductor 54 connecting the amplifier output terminal with the motor-generator input terminal. The motor will of course turn in the direction to move the wiper arm of potentimeter 18 toward a position corresponding to the new value of $\gamma$ sensed by the attitude gyro, until the feedback carried by conductor 51 balances the input from the gyro to the comparator 19 so that the output of the latter goes back to zero, whereupon the motor stops turning.

The feedback from the potentiometer 18 of the integrating servo is also fed to the comparator 21 of the $\varphi$-servo by means of a conductor 55 connected between conductor 51 and switch 2 and another conductor 55' connecting that switch with comparator 21. The other input to comparator 21 is a feedback from the wiper of the $\varphi$-servo potentiometer 25, which is electrically connected with said comparator by means of a conductor 56, the switch 4, and another conductor 56'. The output terminal of comparator 21 is connected with the input terminal of amplifier 22 by means of a conductor 57, and the output side of said amplifier is connected with the servo motor 23 by means of a conductor 58. It will be apparent that the arrangement of the $\varphi$-servo is such that prior to depression of the pickle switch 20 the wiper of potentiometer 25 is maintained by motor 23, acting through gear connection 24, in a position corresponding to that of the wiper of potentiometer 18; and this relationship corresponds to the fact that just prior to the instant of pickling $\gamma=\varphi$ provided that the pilot has accurately aimed the optical sight axis at the target.

From the instant after pickling that pullout begins, $\gamma$ and $\varphi$ are of course no longer equal, and a function of the value of $\varphi$ must be available in the computer for the purpose of computing and determining the relationship $\gamma_1-\epsilon+\varphi-\alpha=0$, which is, in general terms, the equation that must be satisfied at the instant of release.

As mentioned above, known means are provided in the aircraft for producing an output corresponding to the rate of change of $\varphi$, and that output is so connected to the switch element 5 that when said switch element changes its position, upon depression of the pickle switch 20 and in response to the consequent energization of relay R1, said output is supplied to the integrating servo in place of the output from the attitude gyro. Depression of the pickle switch and consequent energization of relay R2 also opens switch element 7, disconnecting the wiper of potentiometer 18 from comparator 19, and simultaneously closes switch element 8 by which the output of the generator element 16 is delivered to comparator 19, as an input thereto, by means of a conductor 59 connecting said generator element with switch element 8 and another conductor 59' connecting the switch with the comparator. Under these conditions the rate of rotation of the motor-generator 16, and hence the rate of movement of the wiper of potentiometer 18, correspond to the rate of change of $\varphi$, and the position of s wiper along potentiometer 18 at any instant corresponds to the value of $\varphi$ at that instant.

After pickling, the wiper of potentiometer 18 remains connected with the $\varphi$-servo by way of conductors 51, 55 and 55', and the wiper of potentiometer 25 of the $\varphi$-servo continues to reproduce the position of the wiper of potentiometer 18 of the integrating servo. The output of potentiometer 25, corresponding to the instantaneous value of $\varphi$, is supplied to the summation unit 38 by means of a conductor 60 that connects the wiper of potentiometer 25 with the summation unit.

Through the gear connection 24, the motor 23 of the $\varphi$-servo also maintains the shafts of resolvers 26 and 27 in positions that correspond to the instantaneous value of $\varphi$.

From the altimeter means an input voltage proportional to altitude $y$ is applied to one input winding 62 of resolver 26, by means of a conductor 63 connecting the output of the altimeter means with said winding. From the output winding 64 of the resolver 26 there is a feedback connection to the input of an amplifier 28, provided by a conductor 65, and the output of that amplifier is applied to the other input winding 66 of resolver 26 by means of a conductor 67 connected between the amplifier and switch 3 and another conductor 67' connecting said switch with output winding 66. If the amplification factor of amplifier 28 is designated by A, the voltage at the output of the amplifier by $u_1$, and the voltage applied to input winding 62 of the resolver (corresponding to altitude) is designated by $y$, the following relationship is obtained by the circuit $A(y \cos \varphi - u_1 \sin \varphi) = u_1$, whence it follows that if A is very large the voltage $u_1$ of the amplifier output is, to a good approximation, $y \cos \varphi$, which is the same as the horizontal distance $x$ (FIGURE 3). The output of the amplifier 28 is applied, by means of a conductor 69 connected to conductor 67' and another conductor 70 connected to conductor 69, to an input terminal of the comparator 30 in the $\epsilon$-servo mechanism, to which further reference is made hereinafter.

From the speed sensing means in the aircraft a voltage output corresponding to the square of the velocity is applied to one input winding 72 of the resolver 27, by means of a conductor 73 connecting the speed sensing means with said winding. The output winding 74 of resolver 27 is connected with the input of an amplifier 29 by means of conductor 75, and the amplifier output is in turn connected with the other input winding 76 of resolver 27 by means of a conductor 77, and also with another input terminal of comparator 30 by means of a conductor 78. The output of amplifier 29 is given by the relationship $A(v^2/g \sin \varphi - u_2 \cos \varphi) = u_2$, whence it follows that if A is very large, the voltage output $u_2$ of amplifier 29 is, to close approximation, $v^2/g \cdot \tan \varphi$.

The resolver 36 of the $\epsilon$-servo has its shaft positioned by the motor 32, acting through gear connection 33; and motor 32 is energized by the output of comparator 30, as amplified by amplifier 31. One input winding 80 of resolver 36 is connected with the speed sensing means, as by means of a conductor 81 connected between said winding and conductor 73. Hence the value of the voltage applied to winding 80 corresponds to $v^2$. The other input winding 82 of resolver 36 is connected with conductor 78 by means of a conductor 83, so that the value of the voltage applied to winding 82 corresponds to $v^2/g \cdot \tan \varphi$. The output winding 84 of resolver 36 is connected with another input terminal of comparator 30 by means of a conductor 85. Since the voltage inputs to windings 80 and 82 of resolver 36 respectively correspond to $v^2$ and to $v^2/g \cdot \tan \varphi$, its output voltage corresponds to $v^2/g (\tan \varphi \cos 2\theta - 2\theta)$, where $2\theta$ designates the angular position of the shaft of resolver 36. The input voltages to comparator 30 respectively correspond to $x$ (conductor 70), $v^2/g \cdot \tan \varphi$ (conductor 78) and $$v^2/g (\tan \varphi \cos 2\theta - \sin 2\theta)$$

(conductor 85), and its output, which is fed to the input of amplifier 31 by way of a conductor 87, comprises a difference voltage $\Delta$, the value of which is given by $$\Delta = x - v^2/g \tan \varphi + v^2/g (\tan \varphi \cos 2\theta - \sin 2\theta)$$

The connection of amplifier 31 to motor 32, comprising a conductor 88, is such as to cause the motor to rotate the shaft of resolver 36 in the direction to bring the value of the difference voltage $\Delta$ to zero, with the result that the angular position of the resolver shaft corresponds to the ideal divergence angle, i.e., $\theta = \epsilon_0$.

The wipers of potentiometers 34 and 35, which also comprise elements of the $\epsilon$-servo, are actuated by motor 32 through gear connection 33, and hence the position of each of those wipers corresponds to $\epsilon_0$. The wiper of potentiometer 35 is connected to the summation unit 38 by means of a conductor 89 to thus supply to the summation unit a voltage corresponding to $\epsilon_0$. However the voltage impressed across potentiometer 34 corresponds to $v^2$, because that potentiometer is connected, by means of a conductor 90, with conductor 81 which is in turn connected with the output of the air speed sensing means. Potentiometer 34, unlike potentiometer 35, is nonlinear, the resistance along it being arranged according to a function of the ideal angle of divergence, i.e., $f_2(\epsilon_0)$, and hence the voltage taken off of it by its wiper is proportional to said function and the impressed voltage, i.e., $v^2 \cdot f_2(\epsilon_0)$.

The output of potentiometer 34 is impressed across a potentiometer 37 by means of a conductor 91 which connects the wiper of potentiometer 34 with potentiometer 37. The wiper of potentiometer 37 is manually adjustable from the control panel in accordance with the ballistic factor C of the bomb to be released, and hence the voltage at said wiper corresponds to $c \cdot v^2 \cdot f_2(\epsilon_0) = \Delta_c \epsilon$. That output voltage is fed to the summation unit 38 as another input, by means of a conductor 93 connecting the wiper of potentiometer 37 with the summation unit.

Both before and after pickling the output of the attitude gyro, corresponding to $\gamma$, is fed to the summation unit by means of a conductor 45.

One other input voltage is fed to the summation unit 38, namely a voltage proportional to aerodynamic angle of attack $\alpha$ referenced to the optical axis of the sight, which voltage is provided by known angle of attack sensing means in the aircraft, connected with the summation unit by means of a conductor 94.

It will now be apparent that the input voltages supplied to the summation unit correspond to $$\gamma + \varphi - \epsilon_0 - \alpha - \Delta_c \epsilon$$

Release is to take place when the value of this sum goes to zero.

The summation unit has its output terminal connected to the input side of the release impulse generator 39 by means of a conductor 95. The release impulse generator, in turn, has its output terminals connected with the winding of a relay R4 that controls single-pole single-throw switch elements 11 and 12.

The connection between the release impulse generator and relay R4 comprises a conductor 96 connecting one output terminal of generator 39 with a switch element 9 controlled by a relay R3, another conductor 97 connecting switch element 9 with one terminal of the winding of relay R4, and still another conductor 98 connecting the other terminal of relay winding R4 with the other output terminal of generator 39; and hence energization of the winding of relay R4 requires switch element 9 to be in its closed position. Relay R3, which controls the position of switch element 9 and of another single-pole single-throw switch element 10, is controlled by the pickle switch 20, and is actuated to its closed position by energization of its winding when the pickle switch is depressed.

The pickle switch 20 comprises two switch elements 13 and 14. Switch element 13 provides a connection between a conductor 101 that is connected with a D.C.

power supply and a conductor 102 that is connected with the windings of relays R1, R2 and R3, and hence closure of switch element 13 energizes the windings of those three relays. Switch element 14, when closed, completes a circuit from the D.C. power supply to the bomb release 40 through conductors 103 and 104, conductor 103 being connectable with the D.C. supply through the switch element 11 controlled by relay R4, and conductor 104 being connected with the bomb release mechanism 40. It will be apparent that energization of the bomb release mechanism 40 requires both that switch element 11 be closed, by energization of relay R4 from the release impulse generator, and that switch element 14 be closed, by maintenance of the pickle switch manually depressed; and hence the pilot can prevent release of the bomb by merely releasing the pickle switch to open switch element 14 at any time after pickling and up to the instant of bomb release.

Relay R3, which actuates switch element 9 in the circuit comprising the winding of relay R4, also actuates switch element 10 in a holding circuit comprising switch element 12 controlled by relay R4, a conductor 106 connecting switch element 12 with switch element 10, and a conductor 107 connecting switch element 10 with conductor 102. Once relays R1, R2 and R3 have been energized by depression of the pickle switch, they will remain energized (even though the pickle switch is released) through the circuit comprising conductor 101, switch element 12, conductor 106, switch element 10 and conductor 107; but they will of course be de-energized when switch element 12 is opened in consequence of energization of relay R4, automatically returning the instrumentality to the condition illustrated in FIGURES 4a and 4b so that it is ready for another bombing run without necessity for the pilot to take further action. This arrangement is of special value where the release mechanism 40 serves several bomb locks and is automatically stepped from one bomb lock to another at each release impulse.

*FIGURES 4a–4b Apparatus—Pull-up bombing mode*

To set up the apparatus illustrated in FIGURES 4a and 4b for pull-up release from level flight, the pilot actuates switches 1–4 to their positions opposite to those shown. It will be noted that in this condition an output from the vertical reference gyro, corresponding to the value of $\gamma$, is again supplied to the summation unit 38 by way of conductor 45, and an output from the angle of attack sensing means is also supplied to the summation unit by way of conductor 94.

In the position of switch element 1 now under consideration, the conductor 52 which carries input voltage to comparator 19 from that switch is now connected with switch element 6, the position of which is controlled by relay R1. A conductor 46 connects switch element 6 with switch 1. Prior to pickling, switch element 6 completes a circuit which connects the integrating servo with a manually adjustable instrumentality (e.g., a potentiometer adjustable at the control device) that provides an output corresponding to the predetermined distance $x_0$ between the IP and the target; hence at that time the wiper of potentiometer 18 occupies a position corresponding to $x_0$. When the pickle switch is depressed, energizing relay R1, switch element 6 changes its position to connect the integrating servo with an instrumentality which produces an output corresponding to the value of horizontal velocity $v_g$. This instrumentality can comprise a known device using data obtained, e.g., from radar equipment, from the aircraft Pitot-static system, or from a combination of these. It will be apparent that after pickling the position of the wiper of potentiometer 18 of the integrating servo corresponds to the instantaneous value of $x$, the horizontal distance to the target.

Because of the position of switch 2 in the pull-up release mode, the output of the integrating servo, manifested in conductor 55, is supplied to one input terminal of the comparator 30 of the $\epsilon$-servo, by way of conductor 70, and to one input terminal 66 of the resolver 26 of the $\varphi$-servo, by way of conductors 69 and 67'. Due to the position of switch 4, the output winding 64 of resolver 26 is connected with one input terminal of comparator 21 by way of a conductor 110 connecting said winding with switch 4, said switch, and conductor 56'. Since the other input winding 62 of resolver 26 remains connected with the altimeter means through conductor 63, the inputs to that resolver again correspond to the values of $x$ and $y$, and its output voltage corresponds to $y \cos \theta - x \sin \theta$, where $\theta$ designates the angular position of the shaft of the resolver. Since the output of resolver 26 is supplied to comparator 21 as the sole input thereto, that output, amplified by amplifier 22, will be applied to motor 23, and will cause rotation of the motor in the direction to bring the output voltage of resolver 26 to zero. Thereupon the angular position of the shaft of resolver 26 will be equal to the instantaneous value of $\varphi$. The output from the wiper of potentiometer 25 will of course likewise correspond to $\varphi$.

The operation of the remainder of the apparatus is the same as in the dive toss bombing mode, and therefore needs no further explanation. It will be apparent that the summation unit 38 again produces an output corresponding to $\gamma + \varphi - \epsilon_0 - \alpha - \Delta_c \epsilon$, and again effects release of the bomb through the release impulse generator 39 and its associated circuitry when its output goes to zero.

*FIGURE 5 Apparatus—Dive toss bombing mode*

In the apparatus illustrated in FIGURE 5 the means for producing an output corresponding to the rate of change of the angle $\varphi$ is replaced by radar or other means for producing an output corresponding to the slant distance $z$ between the airplane and the target, and means for producing an output corresponding to the rate of change of the distance $z$. In this embodiment of the invention the several servos are generally similar to those in the previously described embodiment, and the summation and release circuits are identical to those illustrated in FIGURE 4b, so that the latter figure complements FIGURE 5 as well as FIGURE 4a. Only three manually controllable single-pole double-throw switches 201, 202 and 203 are required in the FIGURE 5 embodiment for selection between the dive toss and pull-up release bombing modes, and of these, switch 201 corresponds to switch 1 in the previously described version. In FIGURE 5, switches, 201, 202 and 203 are shown in their positions for dive toss bombing, and the several switch elements of the relays R1–R4, controlled by the pickle switch 20, are again shown in their positions prior to pickling.

Before the pickle switch is depressed, and with the apparatus turned on and set up for its dive toss bombing mode the integrating servo is connected, through switch 201, conductor 52' and switch element 5, with the means for producing an output corresponding to slant distance to the target, and therefore the position of the wiper of potentiometer 18 will correspond to that distance. The output of that wiper is fed to one input winding 66 of resolver 26 of the $\varphi$-servo by way of connected conductors 51, 155 and 67'. By means of conductor 156' one terminal 164 of the output winding 64 of resolver 26 is connected to one input terminal of comparator 21; the other output terminal 264 of that resolver is connected, by means of conductor 256', switch 202 and conductor 70, with one input terminal of comparator 30.

It will be apparent that the outputs at terminals 164 and 264 of resolver 26 respectively correspond to $$z \cos \theta = x, \text{ and } z \sin \theta = y$$

where $\theta$ denotes the angular position of the resolver shaft. Since the other input terminal of comparator 21 is connected with the altitude sensing means by way of conductor 155' and switch 203, the output of that comparaor corresponds to $y - z \sin \theta$. Motor 23 drives the shaft of resolver 26 in the direction to bring this difference to zero, or in other words to make $\theta = \varphi$, and by this same action the wiper of potentiometer 25 is maintained in a position corresponding to the instantaneous value of $\varphi$.

Since the remainder of the apparatus follows in contruction and operation the previously described embodinent of the invention, no further description thereof is equired.

*FIGURE 5 Apparatus—Pull-up bombing mode*

For pull-up bombing the switches 201, 202 and 203 of the FIGURE 5 apparatus are set to their positions opposite to those shown. Prior to pickling the integrating ervo is, in this mode, connected, through switch 201, conductor 46 and switch element 6, with the manually set P distance instrumentality and the position of the wiper of potentiometer 18 corresponds to the adjustment for hat distance, $x_0$.

After pickling, switch element 6 changes its position to connect the integrating servo with the output of the horizontal rate sensing means, so that the position of the wiper of potentiometer 18 thereafter corresponds to the instantaneous value of $x$, the horizontal distance between he airplane and the target. Thus the inputs to the resolver 26 are the same as those in the pull-up release mode in the apparatus illustrated in FIGURE 4a, and he operation of the remainder of the apparatus follows hat described for pull-up release operation in that embodiment.

It will be noted that the differences between the FIGURES 4a and 5 embodiments of the invention are not so great as to require major revision or modification of the instrumentality to adapt it for one or the other of the respective installations for which those two versions are intended.

It will also be observed that with either embodiment of the invention, set for the pull-up release mode, accurate release of the bomb can be effected even though the pilot continues in level flight after pickling, without making an actual pull-up, since this is merely a special case in which the attitude angle $\gamma$, altitude $y$, and angle of attack $\alpha$ remain constant throughout the bombing run, and horizontal velocity $v_g$ is at all times equal to aircraft speed $v$ along its velocity vector.

It will be further apparent that a completely electronic device for integration could be substituted for the electromechanical integrating servo device herein shown and described, and that the number of resolvers connected with the respective rotatable shafts could be increased to provide for angular corrections for wind, target movement, or both, and such additional resolvers (or some of them) could also comprise part of a device auxiliary to the computer for aiming and releasing rocket missiles.

From the foregoing description taken together with the accompanying drawings it will be apparent that this invention provides a relatively simple, compact and lightweight instrumentality which can be readily adjusted, at the option of the pilot, to provide for either dive toss bombing or pull-up release bombing, and which is adaptable for use with a variety of types of sensing equipment that may be installed in an aircraft in which the instrumentality is used.

What is claimed as our invention is:

1. In a toss bombing computer instrumentality for installation in an aircraft, of the type comprising a manually actuatable element, speed sensing means for producing an electrical output having a value which is a function of velocity of the aircraft, and integrating means, responsive to the outputs of rate sensing means in the aircraft, for producing electrical outputs having values which correspond to functions of the instantaneous values, after actuation of said element, of the angle between the horizontal and a line connecting the aircraft with a target, and of a distance which, together with said angle, defines the instantaneous position of the aircraft relative to the target in a vertical plane through the target in which the aircraft is maneuvered:

(A) a comparator having three input terminals and an output terminal;

(B) means connecting one of the input terminals of the comparator with said integrating means for impressing upon said one input terminal an electrical input corresponding to a function of said distance;

(C) means connecting a second input terminal of the comparator with said integrating means for impressing upon said second input terminal an electrical input corresponding to a function of said angle;

(D) a servo motor connected with the input terminal of said comparator;

(E) an electromechanical resolver having relatively fixed and rotatable parts, one of which comprises input means and the other of which comprises output means;

(F) means mechanically connecting the relatively rotatable part of the resolver with the servo motor, so that the angular position of the rotatable part relative to the fixed part is established by the servo motor;

(G) means connecting the input means of the resolver with said speed sensing means and with the second input terminal of the comparator;

(H) feedback means connecting the output means of the resolver with the third input terminal of the comparator, to thereby cause the angular position of the rotatable part of the resolver to correspond to a predetermined function of aircraft velocity, said angle and said distance; and (I) a variable electrical instrumentality
  (1) having an input terminal connected with a source of electric current,
  (2) having a movable element mechanically connected with said servo motor to be positioned thereby in unison with positioning of the rotatable part of the resolver, and
  (3) having an output terminal at which an output electric current is available that has a value which corresponds to said function of aircraft velocity, said angle and said distance.

2. In a toss bombing computer instrumentality for installation in an aircraft, of the type comprising a manually actuatable element, speed sensing means for producing an electrical output having a value which is a function of velocity of the aircraft, and integrating means, responsive to the outputs of rate sensing means in the aircraft, for producing electrical outputs having values which correspond to functions of the instantaneous values, after actuation of said element, of the angle between the horizontal and a line connecting the aircraft with a target, and of a distance which, together with said angle, defines the instantaneous position of the aircraft relative to the target in a vertical plane through the target in which the aircraft is maneuvered;

(A) an electrical comparator instrumentality having input terminal means and output terminal means;

(B) means connecting the input terminal means of the comparator instrumentality with said integrating means for feeding into the comparator instrumentality electrical inputs corresponding to predetermined functions of said distance and said angle;

(C) a servo motor connected with the output terminal means of said comparator instrumentality;

(D) an electromechanical resolver having relatively fixed and rotatable parts, one of which comprises input means and the other of which comprises output means;

(E) means mechanically connecting the relatively rotatable part of the resolver with the servo motor, whereby the rotatable part is angularly positioned relative to the fixed part by the servo motor;

(F) means connecting the input means of the resolver with the integrating means and with the speed sensing means to impress upon the resolver electrical inputs having characteristics which correspond to functions of said angle and of velocity of the aircraft;

(G) feedback means connecting the output means of the resolver with the input terminal means of the comparator instrumentality, to thereby cause said rotatable part of the resolver to be angularly positioned in correspondence with a predetermined function of aircraft velocity, said angle and said distance; and (H) a variable electrical instrumentality
  (1) having an input terminal connected with a source of electric current,
  (2) having a movable element mechanically connected with said servo motor to be positioned thereby in unison with positioning of the rotatable part of the resolver, and
  (3) having an output terminal at which an electrical output is available that has a value which corresponds to said function of aircraft velocity, said angle and said distance.

3. The toss bombing computer instrumentality of claim 2 further characterized by:
a second, manually variable, electrical instrumentality connected between said source of current and the input terminal of the first mentioned variable electrical instrumentality, and adapted to be adjusted in accordance with the ballistic characteristics of a bomb to be dropped so that the output current available at the output terminal of the first mentioned variable electrical instrumentality has a value that corresponds to said function of aircraft velocity, said angle and said distance and to a function of said ballistic characteristics.

References Cited by the Examiner

UNITED STATES PATENTS

| | | | |
|---|---|---|---|
| 2,438,112 | 3/1948 | Darlington | 235—61.5 |
| 2,985,365 | 5/1961 | Helgeson et al. | 235—61.5 |
| 3,003,398 | 10/1961 | Lalli | 235—61.5 XR |
| 3,132,561 | 5/1964 | Holland | 235—61.5 XR |

OTHER REFERENCES

Fifer, Analogue Computation, vol. III, pp. 644–645, New York, McGraw-Hill, 1961.

MALCOLM A. MORRISON, *Primary Examiner.*

K. W. DOBYNS, *Assistant Examiner.*